A. HAERLE.
AUTOMATIC TANK-FILLER.

No. 174,420. Patented March 7, 1876.

WITNESSES:
C. Neveux
J. Goethals

INVENTOR:
A. Haerle
BY
[signature]
ATTORNEYS.

UNITED STATES PATENT OFFICE.

AUGUST HAERLE, OF CINCINNATI, OHIO.

IMPROVEMENT IN AUTOMATIC TANK-FILLERS.

Specification forming part of Letters Patent No. 174,420, dated March 7, 1876; application filed February 5, 1876.

*To all whom it may concern:*

Be it known that I, AUGUST HAERLE, of Cincinnati, in the county of Hamilton and State of Ohio, have invented a new and Improved Automatic Tank-Filler, of which the following is a specification:

My invention consists of cocks in the filling-pipes, and a cock in a relief or signal pipe attached to the filling-pipe, connected with a float in the tank in such manner that the float closes the cocks of the filling-pipe and opens the one in the relief-pipe when the tank is full, and when the water falls a little opens the filling-pipe and closes the other, and thus automatically maintain the required quantity in the tank.

The apparatus is applicable to railroad, beer, oil, and other tanks, and is calculated to save much time and labor of attending to the filling of them.

Figure 1:
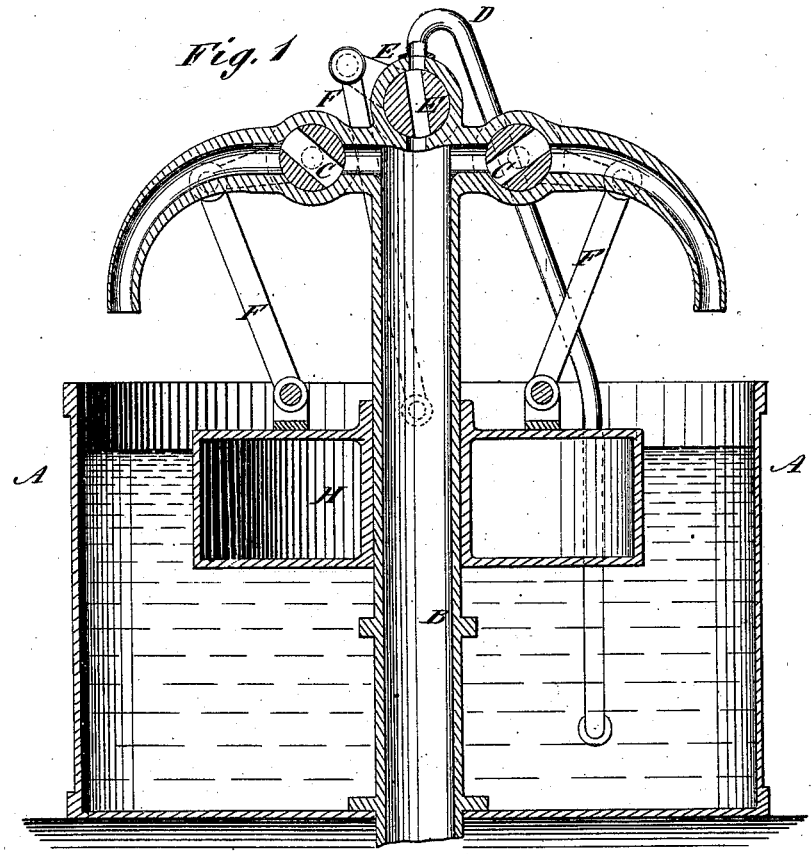
Figure 2:
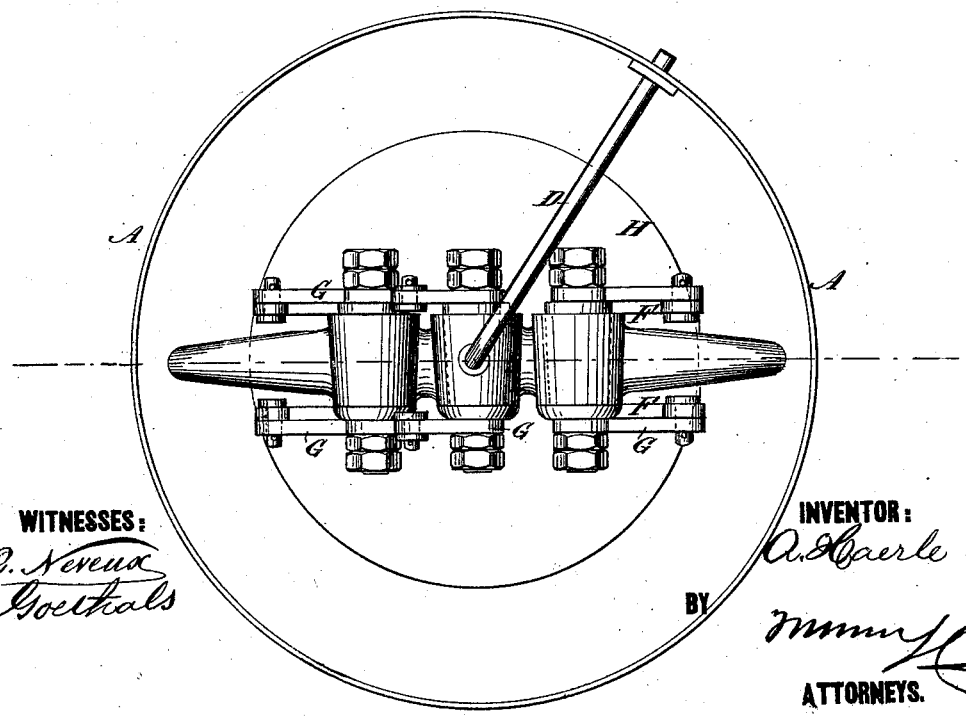

Figure 1 is a sectional elevation of my improved automatic filler, the section being taken on the line *x x* of Fig. 2; and Fig. 2 is a top view.

Similar letters of reference indicate corresponding parts.

A is the tank, for water, beer, or other liquid. B is the filling-tube; C, the cocks in the same for shutting off the supply when the tank is full. D is the relief or signal pipe for the escape of the liquid when cocks C are closed, to relieve the feed-pipe of the pressure, and to show to the attendant by the running liquid through it that the tank is full. E is the cock in the relief-pipe, and H is the float. The cocks are connected to the float by an arm, G, and rod F, which are so adjusted that cock E opens a little before cocks C close, so as not to shut off the escape of the water, and cause pressure to rise in the filling-pipe, and in the reverse operation the cocks C open a little before cock E closes, for the same purpose. Besides relieving the pipe B from undue pressure, the escape-pipe D may be employed as a signal for showing when the tank is full by the water running through it.

Having thus described my invention, I claim as new and desire to secure by Letters Patent—

The filling-pipe, relief-pipe, the cocks in the same, and the float, combined in a tank in such manner that the cocks are automatically opened in the filling-pipe and closed in the relief-pipe, and vice versa, and so that the opening of the one is effected a little in advance of the closing of the other, substantially as specified.

AUGUST HAERLE.

Witnesses:
 JAMES ROBINSON,
 CHARLES ALBERT.